Jan. 24, 1950 W. S. BODINUS 2,495,625
WORT PROCESSING
Filed Feb. 5, 1947
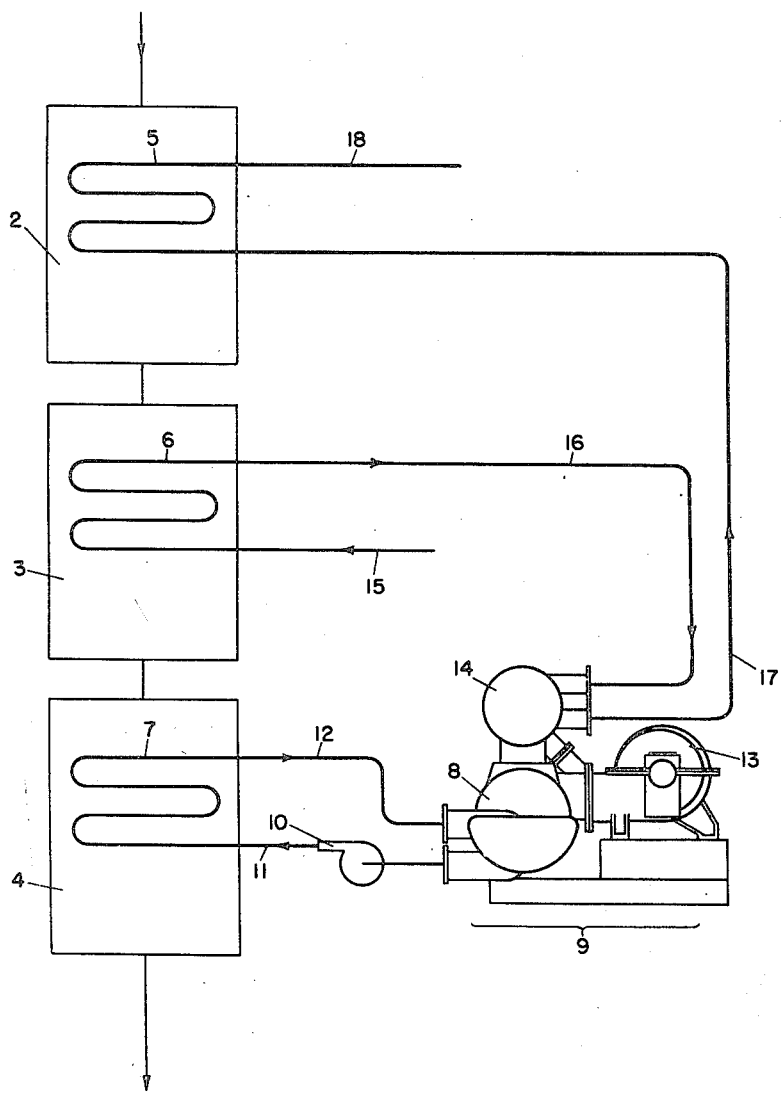
INVENTOR.
William S. Bodinus
BY Patented Jan. 24, 1950

2,495,625

UNITED STATES PATENT OFFICE 2,495,625

WORT PROCESSING

William S. Bodinus, Chicago, Ill., assignor to Carrier Corporation, Syracuse, N. Y., a corporation of Delaware Application February 5, 1947, Serial No. 726,564

7 Claims. (Cl. 62—141)

This invention relates to wort processing and more particularly to a system and process of cooling wort to desired temperature while raising the temperature of a medium employed for such purpose to a point rendering it of value for sparging and other uses within the brewery.

The chief object of the present invention is to provide an economical process for cooling wort in which cooling water employed in heat exchange relation with the wort is raised in temperature to a point rendering it of value for other uses within the brewery.

An object of the present invention is to provide an economical system of wort processing in which the wort is cooled to a desired temperature, the material employed to cool the wort being raised in temperature to a point permitting its utilization in other processes within the brewery.

A further object is to provide a process of cooling wort in a plurality of stages in which city water may be employed in one stage, such water then being utilized to condense refrigerant employed in a second stage and, after its use to condense the refrigerant, employed in a third cooling stage, the city water being raised in temperature by its passage through the various cooling stages to a point rendering it of use for sparging and similar purposes. Other objects of my invention will be readily perceived from the following description.

This invention relates to a system for wort processing in which the wort is passed through a plurality of cooling stages. In the final cooling stage, the wort to be cooled is disposed in heat exchange relation with a refrigerating fluid such as a cooled brine or by directly expanded refrigerant. The brine, if used, is, of course, cooled by a suitable refrigeration machine. In an intermediate stage of cooling, water at a normal temperature is directed in heat exchange relation with the wort to be cooled, the water then being directed through the condenser of the refrigeration machine to condense refrigerant employed to cool brine utilized in the final cooling stage. The water after its passage through the condenser of the refrigeration machine is directed to a pre-cooling stage and is again disposed in heat exchange relation with wort to be cooled. The water, by its passage in heat exchange relation with the wort and by its passage through the condenser of the refrigeration machine, is raised in temperature to a point rendering it of value for use in sparging and similar applications.

The attached drawing is a diagrammatic view illustrating the wort processing system of the present invention.

Referring to the drawing, there is illustrated a processing system for wort. The system includes a first or pre-cooling stage 2, a second or intermediate cooling stage 3, and a final cooling stage 4. It will be appreciated, if desired, additional cooling stages may be employed. Heat exchange members 5, 6, and 7 in the form of coils are disposed at cooling stages 2, 3, and 4 respectively and serve to place cooling medium passing through the coils in heat exchange relation with wort directed through such stages. The direction of travel of the wort through the various cooling stages is indicated by the arrow.

Considering stage 4 (the final stage of cooling), a cooler 8 forming a part of a refrigeration machine indicated generally at 9 provides cooled brine for passage through heat exchange member 7. The brine is circulated from cooler 8 by pump 10 through line 11 to heat exchanger 7 and is returned to cooler 8 through line 12. Preferably, refrigeration machine 9 includes a compressor 13 which may be of the centrifugal type to provide refrigerant to cool the brine in cooler 8. A condenser 14 forms a portion of refrigeration machine 9 and is attached to compressor 13. Refrigerant to be condensed passes from compressor 13 to condenser 14 where the refrigerant is disposed in heat exchange relation with water as hereinafter described, the condensed refrigerant passing to cooler 8 where it is evaporated to cool the brine and is then returned to compressor 13.

It will be appreciated, if desired, a direct expansion refrigeration system may be employed in the final cooling stage, the refrigerant rather than a brine being placed in heat exchange relation with the wort being cooled. In such case, of course, the evaporated refrigerant is compressed, disposed in heat exchange relation with water as above described to be condensed, and again supplied to the final cooling stage.

In the second intermediate stage of cooling, water at a normal temperature is supplied through line 15 to heat exchanger 6. Such water preferably comprises city water, i. e. water taken from the customary water supply of a community, well water and the like, although other sources of supply may be used. Wort is cooled in such stage while the water is raised in temperature. The water, after its passage through heat exchanger 6, passes through line 16 to condenser 14 and is placed in heat exchange relation with refrigerant to be condensed. By passage through condenser 14, the water is again raised in temperature. Water leaving condenser 14 passes through line 17 to the first or pre-cooling stage. Water from line 17 is directed through heat exchanger 5 in heat exchange relation with wort to be cooled, the water again being raised in temperature. From heat exchanger 5, the water is directed through line 18 to a suitable place of use for sparging or similar purposes within the brewery.

Wort passing to the first stage of cooling is at a temperature of about 210° F. The water supplied to such pre-cooling stage is at a temperature of about 106° F., such temperature being attained as hereinafter explained. By passage in heat exchange relation, the wort is cooled to a temperature of about 109° F. while the water is raised in temperature to about 157° F. rendering it of value for other applications within the brewery. In the second or intermediate cooling stage, the wort is supplied at a temperature of about 109° F. while the city water supplied in such stage is about 70° F. Passage of the wort and water in heat exchange relation with one another in such stage reduces the temperature of the wort to about 80° F., while increasing the temperature of the water to about 85° F. Such water temperature is of particular importance since the temperature is not so great as to prevent use of the water in heat exchange relation with refrigerant to condense the same.

In the final cooling stage, the wort is reduced in temperature from about 80° F. to about 46° F. while the brine increases in temperature from about 40° F. to about 50° F.

Passage of water from the intermediate stage of cooling at a temperature of about 85° F. to the condenser 14 of refrigeration machine 9 permits the refrigerant employed to cool the brine in the final stage of cooling to be condensed by such water. The water employed in condensing the refrigerant is raised in temperature to about 106° F. which permits the water to be employed in the pre-cooling stage. The temperature of 157° F. to which the water is raised by its passage through the pre-cooling stage in heat exchange relation with the wort is such as to enable the water to be employed in other applications throughout the brewery.

The present invention provides a simple, ready, inexpensive system of cooling wort in which the heat so removed is utilized in other applications. It will be appreciated the system so provided considerably decreases the cost of the process since the water employed to cool the wort in the pre-cooling and intermediate stages serves to condense refrigerant employed in the third stage; passage of the water through these stages cools the wort and raises the temperature of the water by the removed heat permitting its use in the sparging operation; thus the system contemplates a well-balanced operation in which one stream of material is cooled as required while the material which serves to cool such stream is raised in temperature to a point permitting its utilization in a desired application.

While I have described a preferred embodiment of my invention, it will be understood that my invention is not limited thereto since it may be otherwise embodied within the scope of the following claims.

I claim:

1. In a process of the character described, the steps which comprise directing material to be cooled through a plurality of cooling stages; passing a refrigerating fluid in heat exchange relation with said material in a final stage of such cooling, utilizing a refrigeration machine to treat such fluid for passage in heat exchange relation with said material in the final cooling stage; utilizing a conditioning medium in a second cooling stage to cool said material before it passes to the final stage, then directing conditioning medium from said second cooling stage through the condenser of the refrigeration machine in heat exchange relation with refrigerant thereby raising the temperature of the conditioning medium, and passing conditioning medium leaving the condenser again in heat exchange relation with said material in a pre-cooling stage.

2. In a process of the character described, the steps which comprise directing a material to be cooled through a plurality of cooling stages; passing cooled brine in heat exchange relation with said material in a final stage of such cooling, utilizing a refrigeration machine to cool such brine; utilizing water in a second cooling stage to cool said material before it passes to the final stage thereby raising the temperature of the water, then directing the water from said second cooling stage through the condenser of the refrigeration machine to condense refrigerant used to cool the brine again raising the temperature of the water; and passing water leaving the condenser again in heat exchange relation with said material in a pre-cooling stage to pre-cool the same and to raise the water to a desired temperature.

3. In a process of the character described the steps which comprise passing a material to be cooled through a first cooling stage, a second cooling stage, and a third cooling stage; passing cooled brine in heat exchange relation with said material in the third cooling stage, utilizing a refrigeration machine to cool such brine, utilizing water in the second cooling stage to cool said material, then directing water leaving the second cooling stage in heat exchange relation with refrigerant being condensed for use in cooling brine employed in the third cooling stage and directing the water after its passage in heat exchange relation with refrigerant through the first cooling stage in heat exchange relation with said material to pre-cool the same and to raise the water to a temperature rendering it of value for sparging and similar uses.

4. In a process of the character described the steps which comprise passing a material to be cooled through a first cooling stage, a second cooling stage, and a third cooling stage; passing brine at a temperature of about 40° F. in heat exchange relation with the material in the third cooling stage thereby decreasing the temperature of said material from about 80° F. to about 46° F. while increasing the temperature of the brine; employing a refrigeration machine to cool the brine; directing water at a temperature of about 70° F. in heat exchange relation with said material in the second cooling stage, thereby reducing the temperature of the material being cooled from about 109° F. to about 80° F. while raising the temperature of the water to about 85° F.; then directing water leaving the second cooling stage in heat exchange relation with refrigerant being condensed and employed in the third cooling stage to cool the brine, the water being raised to a temperature of approximately 106° F.; and utilizing such water at a temperature of about 106° F.

in the first cooling stage to reduce the temperature of the material being cooled from about 210° F. to about 109° F. thereby raising the temperature of the water to about 157° F. rendering it of value for sparging and similar uses.

5. In wort processing, the steps which comprise passing wort through a pre-cooling stage, an intermediate cooling stage and a final cooling stage; passing brine in heat exchange relation with the wort in said final cooling stage, utilizing a centrifugal refrigeration machine to cool the brine; passing cooling water in heat exchange relation with the wort in the intermediate stage thereby cooling the wort and raising the temperature of the water; then directing the water in heat exchange relation with refrigerant being condensed and used in cooling the brine employed in the final cooling stage; directing the water after its passage in heat exchange relation with the refrigerant through the pre-cooling stage in heat exchange relation with the wort, thereby pre-cooling the wort and raising the temperature to a point rendering it of use for sparging and similar uses.

6. A system of the character described which comprises a first heat exchange member disposed in a first cooling stage, a second heat exchange member disposed in a second cooling stage, a third heat exchange member disposed in a third cooling stage, a refrigeration machine adapted to treat refrigerating fluid for circulation through the heat exchange member of the third cooling stage, said refrigeration machine including a compressor, a condenser, and a cooler, a source of supply of water for circulation through the second heat exchange member, means for directing water leaving the second heat exchange member through the condenser of the refrigeration machine, means for directing water leaving the condenser to the first heat exchange member, and means for supplying water leaving the first heat exchange member to a place of use.

7. In a system of the character described, the combination of a plurality of heat exchange members disposed in a plurality of cooling stages for cooling wort, a refrigeration machine including a centrifugal compressor, a condenser, and a cooler for cooling brine and circulating cooled brine through the heat exchange member of the final cooling stage, a source of supply of water for passage through a heat exchange member disposed in a second cooling stage, means for supplying water leaving the second cooling stage to the condenser of the refrigeration machine in heat exchange relation with refrigerant being condensed, means for directing water leaving the condenser through a heat exchange member disposed in the first cooling stage, and means for supplying water from the first cooling stage for sparging and similar purposes.

WILLIAM S. BODINUS.

REFERENCES CITED

The following references are of record in the file of this patent:

UNITED STATES PATENTS

| Number | Name | Date |
|---|---|---|
| 1,944,056 | Baer | Jan. 16, 1934 |
| 2,135,742 | Brace et al. | Nov. 8, 1938 |
| 2,150,224 | Hull | Mar. 14, 1939 |
| 2,219,815 | Jones | Oct. 29, 1940 |